United States Patent [19]
Toy

[11] Patent Number: 4,554,418
[45] Date of Patent: Nov. 19, 1985

[54] INFORMATION MONITORING AND NOTIFICATION METHOD AND APPARATUS

[76] Inventor: Frank C. Toy, 211 Chelsea Cir., Lake Villa, Ill. 60046

[21] Appl. No.: 495,070

[22] Filed: May 16, 1983

[51] Int. Cl.⁴ .................... H04M 11/00; H04M 1/274
[52] U.S. Cl. .............................. 179/2 DP; 340/825.27; 364/900
[58] Field of Search .................. 179/2 R, 2 A, 2 AM, 179/2 AS, 2 DP, 5 P, 6.02, 6.08, 6.17; 340/825.27, 825.26; 364/408, 200 MS File, 900 MS File

[56] References Cited

U.S. PATENT DOCUMENTS

| 3,082,402 | 3/1963 | Scantlin | 340/825.27 |
| 3,253,263 | 5/1966 | Lee et al. | 340/825.27 |
| 3,310,782 | 3/1967 | Sinn et al. | 364/900 |
| 3,387,268 | 6/1968 | Epstein | 340/825.27 |
| 3,500,327 | 3/1970 | Belcher et al. | 179/2 DP |
| 3,510,591 | 5/1970 | Klein | 179/6.17 X |
| 3,544,722 | 12/1970 | Hartfield et al. | 179/5 P |
| 3,573,732 | 4/1971 | Greenblum et al. | |
| 3,573,747 | 4/1971 | Adams et al. | 340/825.27 |
| 3,581,072 | 5/1971 | Nymeyer | |
| 3,716,835 | 2/1973 | Weinberg et al. | 179/2 DP X |
| 3,737,858 | 6/1973 | Turner et al. | 179/2 AM X |
| 3,821,705 | 6/1974 | Cherlok et al. | 179/2 DP X |
| 3,823,387 | 7/1974 | McClellan | 340/825.27 |
| 3,925,622 | 12/1975 | Robinson | 179/5 P X |
| 3,987,246 | 10/1976 | Willis | 179/2 A |
| 4,122,305 | 10/1978 | Fish et al. | 179/2 A |
| 4,122,307 | 10/1978 | Suehiro | 179/6.17 X |
| 4,187,550 | 2/1980 | Ramos | 364/900 |
| 4,241,237 | 12/1980 | Paraskevakus et al. | 179/2 AM |
| 4,356,545 | 10/1982 | West | 179/2 DP X |
| 4,371,751 | 2/1983 | Hilligoss, Jr. et al. | 179/5 R |
| 4,425,627 | 1/1984 | Eibner | 364/900 |

OTHER PUBLICATIONS

Computer Design, vol. 17 No. 6, Jun. 1978, "Digital Technology Review: Voice Data Entry Terminal Allows User to Select 900-Word Vocabulary".

Primary Examiner—Keith E. George
Attorney, Agent, or Firm—Willian Brinks Olds Hofer Gilson & Lione Ltd.

[57] ABSTRACT

An information monitoring and notification method and apparatus is provided which may monitor many forms of changing data input, such as market and stock market information, and notify a user or users in near real time of the occurrence of identified events of interest. The system and method require no affirmative monitoring or interrogation by the user, and require no specialized equipment to be in the possession of individual users. Intelligence is provided permitting adaptive monitoring of the input data, maximizing the efficiency and reliability of the user contact and notification. Notification is made, for example, via the telephone utility directly to the user by means of a voice synthesized message.

45 Claims, 2 Drawing Figures

INFORMATION MONITORING AND NOTIFICATION METHOD AND APPARATUS

TECHNICAL FIELD

The present invention relates in general to a method and apparatus for receiving, analyzing, and responding to encoded data, and related in particular to a method and apparatus for monitoring financial market information and remotely informing users of the occurrence of selected events, without requiring specialized equipment or affirmative interrogation on the part of the user.

BACKGROUND OF THE INVENTION

It has long been recognized that access to timely information regarding current conditions in the various financial and commodities markets is essential to successful and profitable trading and investment. This is particularly true in today's fast-moving markets where the ability to respond rapidly to changing market conditions within minutes or hours, rather than days, may mean the difference between substantial profits or devastating losses.

In addition, many complex investment strategies require precise and careful timing of specific transactions in response to fluctuating market conditions, and therefore demand timely action.

Unfortunately, it has proved largely impossible for the average investor to take maximum advantage of investments in the financial markets because of the relative inability of an individual to continuously monitor such daily fluctuations in the markets.

Although various information services, such as the stock ticker and, more recently, various computer data networks, have long existed for distributing information pertaining to daily activities in the various financial markets, such services are of little use to the average investor who does not have the time to continuously monitor the received information. As a result, large investors, and those who can afford the continuous monitoring services of investment brokers, have typically had an advantage in market investments.

Various systems have been presented in an attempt to alleviate these shortcomings and provide relevant market information to users who are not able to continuously monitor these data services. For example, Weinberg et. al., U.S. Pat. No. 3,716,835 issued FEB. 13, 1973 discloses a compact user terminal which permits an investor to personally access a data bank containing updated information regarding the present markets, without the need to contact a broker for quotes. Similarly, Lee et al., U.S. Pat. No. 3,253,263, issued May 24, 1966, discloses a system for providing audio quotations to the user upon inquiry, again without requiring intervention by a broker.

Epstein, U.S. Pat. No. 3,387,268 issued June 4, 1968 provides an apparatus which improves upon the foregoing by independently accumulating data pertaining only to those particular financial transactions of interest, such as those pertaining to preselected stocks. This specialized data bank is then available to the user for "interrogation," whereby the investor may request information pertaining to the stock of interest. In addition, Epstein provides an alarm to notify the user when a preselected threshold condition is met, such as a preselected minimum or maximum trading price on a particular stock. The investor may then initiate an interrogation to obtain the relevant market information.

There are many shortcomings with such existing systems, however. For example, they each require some form of user interrogation or inquiry in order to initiate the market data transfer. Even the device of Epstein requires that the user observe the alarm indication and thereafter interrogate the unit to obtain the relevant information. This requirement for user intervention renders such prior art systems unusable by the average investor, who does not have time to continuously interrogate systems such as Weinberg et al., or to monitor an alarm output of systems such as disclosed by Epstein.

In addition, such prior art systems often require the user to have substantial specialized hardware and equipment. For example, Weinberg et al. requires that the user possess a specialized data terminal, while Epstein requires the user to have substantial information receiving and processing equipment on hand. The expense of purchasing or otherwise obtaining such specialized equipment places such systems beyond the reach of an average investor. Further, these systems are useful only when the user has immediate access to the requisite equipment, a severe limitation.

Finally, such prior art systems are limited in their utility, in that they are not adaptive to changing market conditions. For example, whereas an investor may desire to be informed of the occurrence of a first event under certain existing market conditions, other market conditions or past trends may make this data unimportant, or may make it desirable to be informed upon occurrence of some alternative event. Thus, simple data bank interrogation units and existing systems responsive to preselected criteria are of limited utility.

In view of the foregoing, it becomes an object of the present invention to provide an economical system for monitoring financial market data, and for informing investors upon occurrence of particular events or trends of interest. Specifically, it is a particular object of the present invention to provide such a method and apparatus that is amenable to use by numerous subscribers, and which requires little or no specialized equipment to be in the possession of the individual users.

A related object of the present invention is to provide an information monitoring and notification system and method for contacting the subscribing users via standard telecommunications utility equipment upon occurrence of user-selected events. A further object is to provide such a system and method for thereafter transmitting the relevant information directly to the subscriber via such standard telecommunications equipment.

Yet another object is to provide for alternative subscriber notification procedures such that the user may receive the desired information at a multiplicity of alternative locations. A related object is to provide a method and apparatus which continues to attempt notification until receiving a verification by the subscriber that the notification and information have been received.

Another object of the present invention is to provide a method and system with adaptable parameters whereby the conditions upon which subscriber notification is initiated are responsive to the received market data and trends, according to algorithms specified by the subscriber.

In keeping with the foregoing, yet a further object is to provide for exclusive or alternative notification of a standard home computer terminal upon occurrence of the event of interest, whereby the information of interest is thereafter transmitted to the standard home computer terminal of the subscriber.

A further object is to provide such a method and apparatus which will permit the user or users to remotely contact the system and modify the parameters controlling which data is of interest, how the data is to be processed, and/or how the user is to be contacted. A related object is to provide a system which such contact may be accomplished via standard telecommunications networks.

Yet a further object is to provide such an improved method and apparatus for information monitoring and notification at a minimum of cost, and in a fashion amenable to advantageous use by a typical investor with a minimum of distraction or user intervention.

These and other advantages, objects, and features of the present invention will become apparent in light of the present specification and accompanying drawings.

BRIEF SUMMARY OF THE INVENTION

In order to achieve the aforementioned objects and to overcome the shortcomings and problems associated with the prior art, the present invention provides a method and apparatus for monitoring a continuous stream of input data and notifying one or more users upon occurrence of preselected events of interest.

Input data pertaining to one or more classes of events of interest, such as one or more sources of financial market and stock information, is received and read by the system. This input data is compared to a user-specified list of specific subclasses of information which are of interest, such as a list of user specified securities.

When data corresponding to the preselected list of relevant data is received, it is processed in accordance with a set of preselected criteria and conditions. For example, if the received data relates to a historical file which is being maintained, the historical file is updated accordingly. In addition, if functional calculations dependent upon the received data have been specified, such functional calculations are performed.

In addition to the listing of relevant subclasses of data, the user-specified conditions also may contain a list of threshold values which represent specific conditions upon which the user desires to be notified of certain related pertinent data. The system and method of the present invention compare the received data, and the processed and calculated data derived therefrom, to the threshold values, and initiate an appropriate contact sequence when one or more of the values is met.

Similarly, the user may specify that one or more of the processing parameters or thresholds previously discussed be updated and modified upon occurrence of some preselected event. In such cases, the associated adaptive parameters are appropriately updated when the related threshold value is met.

The user-specified conditions may be supplied to the system via a data terminal, or may be transmitted to the system by the user via telecommunications networks. In the latter instance, the data may be transmitted as speech for reception by voice recognition decoder apparatus, or may be transmitted as other coded audio signals such as the dual tone multi-frequency output of a standard push button telephone key pad or the dial pulse output of a rotary dial for reception by appropriate decoders.

The contact sequence is designed to notify users directly in near real time that a specified threshold value has been met. In a preferred embodiment, this notification occurs remotely via standard telecommunications networks, such as the telephone system.

Among the user-specified data stored by the system is a list of telecommunications addresses, such as telephone numbers, at which the user may be reached, as well as certain additional information regarding alternative numbers in a hierarchical listing at which the user may optionally be contacted should the primary contact not succeed. Additional information, such as the time of day at which certain numbers are the primary contact addresses, may also be provided.

The contact sequence initiates a contact as directed to the primary contact address. If the desired contact is established, an appropriate informative message is delivered. User verification that contact has been established and/or that the message has been received may be required prior to and/or following transmittal of the relevant information, thereby providing increased security for the data and providing additional intelligence to the contact sequence to avoid its premature termination.

The information transfer may be delivered directly to the human user by means of a voice synthesized message delivered via, for example, the telephone system. In this manner, the user receives near instantaneous notification, with a high reliability factor of successful notification resulting from the use of the previously described hierarchical listing of alternative telephone numbers and required verification. In addition, contact may be established directly with a user data terminal via an automatic answering device, whereby the data is then transmitted in a machine readable data stream.

If successful contact is not established, or if a verification is required but not received, the system and method of the present invention may provide for a repeated attempt after some preselected delay, and/or for attempting further contact at alternative contact addresses contained within the hierarchical listing. This may continue until a successful contact is established or until the last entry in the hierarchical listing has been tried. If not successful contact is established, the system may either terminate the contact attempt, or may store the data to be transmitted and reinitiate a new contact sequence after a preselected delay period.

DETAILED DESCRIPTION OF PREFERRED EMBODIMENT

The remaining portion of the specification will describe preferred embodiments of the invention when read in conjunction with the attached drawings.

Figure 1:
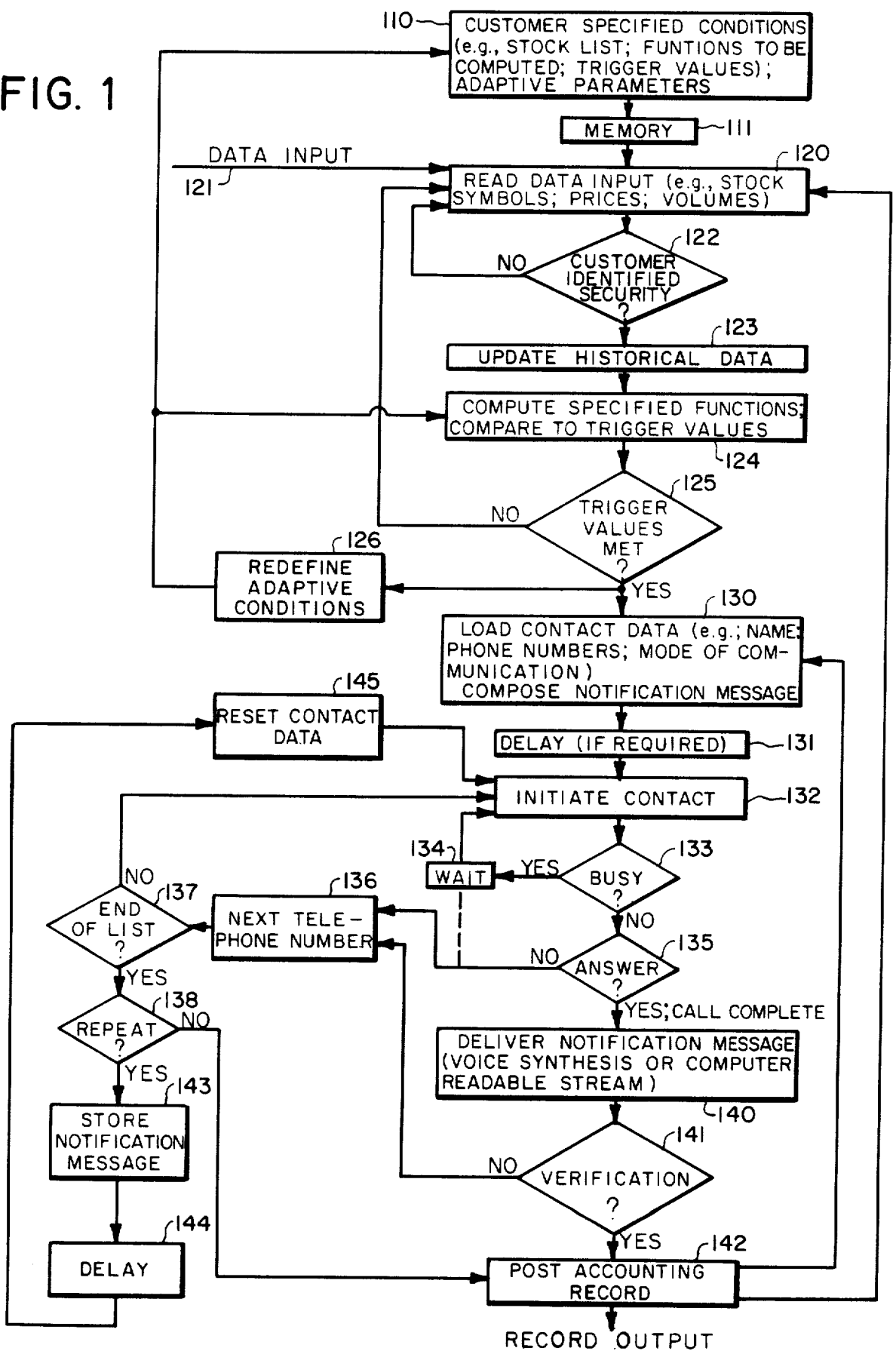
FIG. 1 is a flow diagram representing the operation of a preferred embodiment of the method and apparatus of the present invention.
Figure 2:
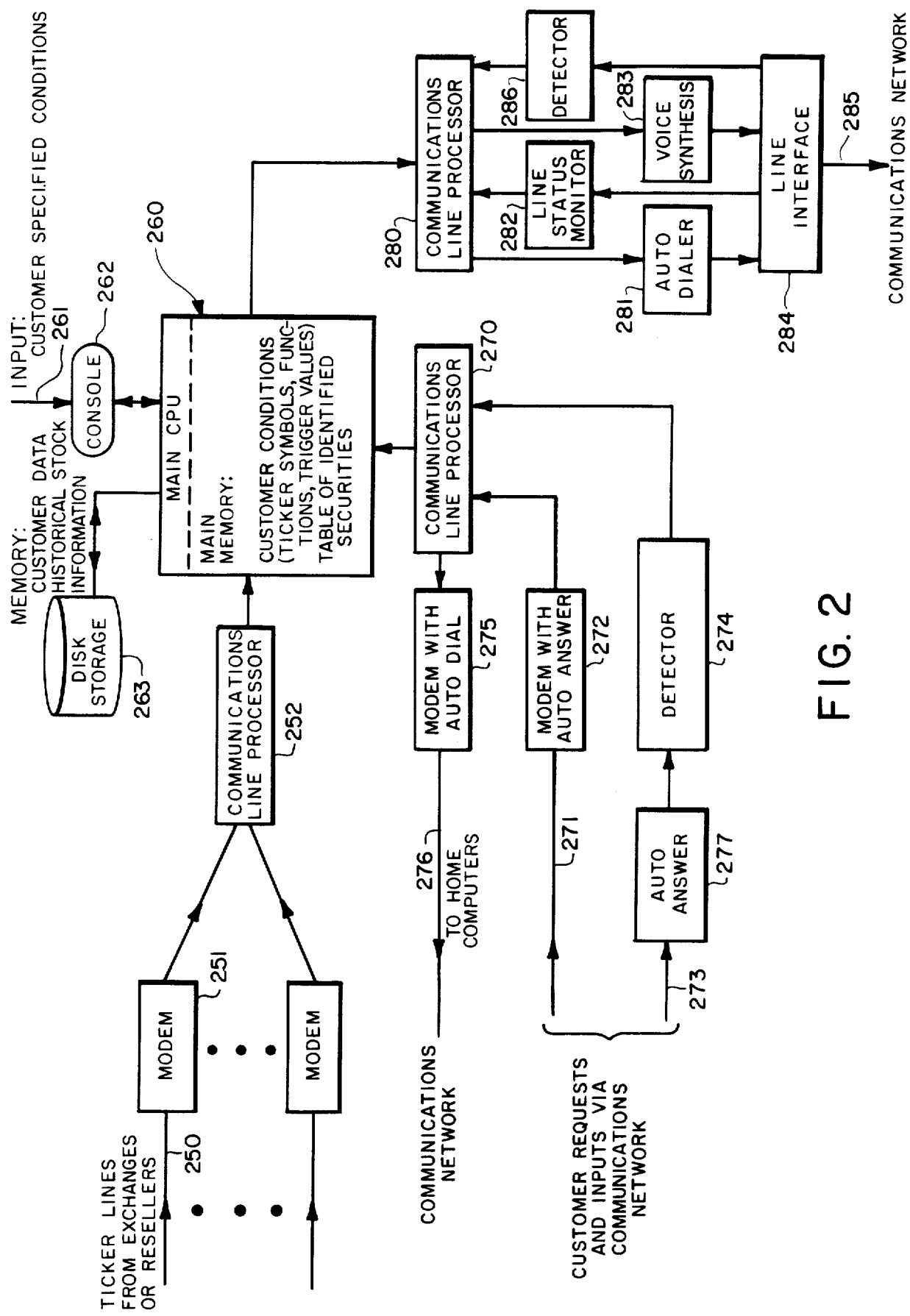
FIG. 2 is a functional block diagram of the basic configuration of a preferred embodiment of the present invention.

Operation of the present inventive method and apparatus for information monitoring and notification may be best understood with simultaneous reference to FIG. 1, which depicts a logical flow diagram of a preferred method of operation, and FIG. 2, which depicts a preferred system configuration for implementing the method of FIG. 1. For clarity all reference numerals prefixed by "1" (100–199) refer to corresponding elements found in FIG. 1, while those prefixed by "2" (200–299) refer to elements found in FIG. 2.

The system is initialized by entry of customer specified conditions 110 into the memory 111 of the associated microprocessor-based or other computerized storage and control system. This memory 111 may comprise any form of permanent or semipermanent data storage. However, in order to accommodate real-time analysis of a continuous ticker input stream 250 with respect to a multiplicity of conditions for multiple users, it is desirable to retain the customer specified conditions 110 in high speed random access electronic memory, such as the main memory of the data processing system 260 of the preferred embodiment. In this manner, these data may be rapidly accessed for comparison and processing, and may be added to, deleted, or modified in real time, per customer request.

The customer specified conditions 110 will include a listing of specific securities which the user desires to hae monitored. By way of illustrative example only, such a listing may include such entries as: IBM common stock; AT&T $4 preferred stock; U.S. Steel 1996 Bond; or August 1983 Corn Future's Contracts. In addition, a user may specify some group of stocks or commodities, such as: the Dow Jones 30 Industrials; the New York Stock Exchange Transportation group; or any other customer specified group. Combinations of the foregoing are also possible, and the present invention may be utilized in a similar fashion with respect to any reported financial or other data of interest.

The customer specified conditions 110 may also include, at the user's option, a functional calculation to be performed on the received data. The results of such functional calculations may then be used as inputs to the trigger value determination discussed below, so that the user may be automatically notified upon occurrence of some derived event of interest, rather than merely in response to simple real-time price or volume data as with the prior art discussed.

In order to achieve this advantaage, it is necessary for the user to specify which data from the stock ticker or other financial data service are to be utilized, and which historical information is required. With regard to historical information, the data processing system 260 may maintain in memory a historical information file containing past data on particular stocks of interest, or accumulated averages or totals derived from such data. In the preferred embodiment this historical data may be stored in non-volitile magnetic disc memory 263, which provides economical mass storage and acceptable access times. However, alternative forms of, for example, magnetic, magnetic bubble, electronic, or optical storage may be utilized.

The user further must specify the conditions on which the selected data are to be used, what function or functions are to be computed from these data, and what adaptive modifications to the existing specified conditions are to be made. By way of illustrative example only, the user may request that the real-time last sale price data received from the stock ticker or other information service be considered only for those trades of 5,000 shares or greater, or that the user be notified of a specific price threshold only if the cumulative volume in the stock of interest exceeds, for example, 1,000,000 shares in a given day's trading. Moving averages of last sales prices for specified categories of trade may be requested, or the user may request a computation of the difference between the current price and the previous day's closing price, divided by the number of shares in a given trade. Additional examples far to numerous to discuss are similarly possible.

The user further may specify that the use made of subsequently received data change in response to certain presently received data. For example, the user may want to be notified in a first manner if the present trading price of a given stock drops below a given threshold, yet desire that this threshold fluctuate according to, for example, the trading average of a specified group of securities. The present invention therefore may monitor the performance of the specified group, and automatically modify the affected trigger value without the need for any user intervention or action. This automatic adaptivity may greatly enhance the convenience and utility of the resulting system.

Finally, during initialization the user may provide one or more trigger values, thresholds, or specified events. Upon occurrence of any of these specified conditions, the method and apparatus of the present invention automatically initiates a contact sequence for notifying the user of such occurrence. For example, the user may request to be advised when the real-time last sale price of a given stock exceeds a specified trigger price. Similarly, the user may reequest to be notified when the results of one or more of the previously discussed functional calculations achieve a desired trigger level, or may request to be notified only when a specific level is reached in a specified direction (e.g., rising or falling).

This initialization of a preferred embodiment of the present apparatus may be accomplished in numerous ways. In one configuration, the customer specified conditons 110 and customer data are provided as an input 261 to a control console 262 functionally attached to the data processing system 260. The central processing unit of the processing system 260 may receive the input and store the customer conditions in memory as discussed, and may store the historical stock information in the appropriate memory such as disc storage 263. Thus, an operator of the system may perform the initialization from any suitable console 262, such as a standard data terminal.

Alternatively, the user may initialize or modify existing information and specified conditions directly via standard telecommunications networks, such as, for example, a telephone network. In one configuration, the user may utilize standard telephone subscriber equipment (not shown) and telephone lines 273 to contact an automatic answering device 277. Detector 274 then receives and decodes the dual tone multi-frequency dial pad output of the user telephone set, or the pulse code output of the rotary dial circuit of the user's telephone. By appropriate operation of such dialing devices according to a selected coding scheme, the user may provide an intelligible data stream to the detector 274, which data is interpreted by a communication line processor 270 for use by the data processing system 260.

Alternatively, detector 274 may comprise appropriate voice recognition apparatus, such that the user may contact the system and supply or modify the desired specified conditions 110 by spoken instructions.

In another configuration, the user may utilize telephone line 271 to connect a data terminal or home computer to the data processing system 260 via automatic answering data modem 272. Properly modulated data concerning the desired initialization or modification of the customer specified conditions 110 may then be transmitted by the user to the system. Other forms of remote data input known in the art may also be utilized.

In addition to supplying the customer specified conditions 110, it is also necessary to initialize the system by providing necessary customer and contact data for use during the customer contact sequence described below. This information may include the user's name, a hierarchical listing of contact addresses (such as a listing of telephone numbers at which the user may be contacted and the order in which each should be tried until contact is established), and a set of contact conditions. These conditions will specify, for example, whether the notifying phone call or other contact should be made to the user directly, and/or to a home computer or data terminal of the user. In addition, these conditions may provide for special contact procedures during certain times of the day or week, or when, for example, the user is on vacation. Provision may also be made for requiring user verification before terminating a contact sequence, or for any similar requirements or limitations desired by the user.

This customer and contact data may be input by way of the control console 262 or other customer input systems previously discussed. Thus, the contact data may be modified by the system operator or by the user directly, so that the system retains maximum flexibility and may be easily tailored to provide an optimal contact scheme for the user. The customer and contact data is stored in memory, which in the preferred embodiment comprises disc storage 263.

The communication line processor 270 of the preferred embodiment comprises an independent processor that may be programmed to handle functions such as protocol conversion, format conversion, and error checking and correction, thus relieving the central processing unit from such tasks and providing intelligence to the communications line involved. Alternatively, the received input data may be supplied directly to the CPU of the data processing system 260 for processing. In either instance, security measures, such as secret access codes, may be incorporated to prevent access to the system or modification of the previously specified parameters by anyone other than the authorized user.

Although the preferred embodiment contemplates use of telephone lines for providing user access for initialization, it is understood that alternative forms of data communication may similarly be utilized, such as two-way cable systems or other communication networks and utilities.

After the system is initialized with the required data as discussed, the information monitoring and analysis functions may begin. Input data 121 may comprise stock ticker data, securities or financial data from other sources, or any form of information for which monitoring and notification are desired.

In a preferred embodiment of the present apparatus, the input lines 250 are connected to appropriate receiving modems 251. A multiplicity of input lines 250 and associated modems 251 may be provided to accommodate all information services of interest. The receiving modems 251 are connected to an input communication line processor 252, which performs protocol and format conversions, checks for transmission errors and requests retransmission of necessary information, unblocks and interprets the received information, discards extraneous information and formats the desired data for subsequent use by the data processing system 260, and provides necessary interrupt and handshaking functions for buffering the input data for use be the main CPU of the data processing system 260. In this manner, the main CPU is provided with a single reformatted transaction at a time, while the information sources 250 are continuously monitored on a real-time basis.

Although the main CPU of the data processing system 260 itself could alternatively provide such processing functions, use of an independent communication line processor 252 in the preferred embodiment reduces the computational overhead of the main CPU and permits increased real-time monitoring and analyzing capabilities for the system. The line processor 252 may therefore comprise a separate microprocessor system for receiving and manipulating the input data 121 as described.

The data processing system 260 accordingly may read 120 a single reformatted transaction or data input. This information may contain, among other things, a ticker symbol indicative of the particular security involved, the last price of the security, the market which gave the last price, and trading volume information. After reading 120 this data, a check 122 is performed to determine whether the security involved is one of those previously specified by a user. If not, the data processing system 260 prepares to read 120 the next data input 121. However, if the security is within the customer specified list of identified securities, the data processing system 260 retains the related information and determines the manner in which the data is to be utilized. For example, if the data is relevant to a historical data file being maintained by the system, the historical data is appropriately updated 123 to reflect this most recent input data. If one of the customer specified conditions requires not only the updated historical data but also the value of the historical data prior to this most recent transaction, the previous historical data may be retained within a temporary memory buffer in a manner known in the art.

After updating 123 the internal historical data files, the method and apparatus of the present invention selects from the customer specified conditions all specified functions and algorithms which depend upon the recently received information, or the historical data files affected. The data processing system 260 then computes 124 the value of each specified function using the received data, the updated historical data, and the temporarily stored previous historical data if necessary.

The present method and apparatus then compares 124 the value of the received data, or of the calculated functions relating to that data, to the stored table of threshold or trigger values corresponding to these data. If none of the trigger values or conditions are met 125, the processing of this input is terminated, and the system prepares to receive and read 120 the next data input 121.

If one or more of the specified contact trigger values and conditions (such as rising or falling directions) are met 125 by the input and/or computed values, the data processing system 260 initiates a contact sequence for informing the interested user or users that their specified trigger values have been met. Similarly, if the trigger value met corresponds to a desired modification of an adaptive specified condition, the affected condition is redefined 126 as desired, and the listing 110 of customer specified conditions is appropriately updated. In addition, it may be desirable to perform a comparison 124 of the received data to the newly updated conditions and trigger values.

It is seen, therefore, that a contact sequence is scheduled for each user whose specified or adaptive conditions have been satisfied. This contact sequence may be controlled by the main CPU of the data processing system 260, or may be controlled by an independent processing system. In either event, it is necessary that the data processing system 260 continue to monitor the various input lines 250 and perform the aforedescribed functions in response to each received individual transaction 121, in approximately real-time. Of course, temporary storage and buffering of this input data 121 may be accomplished by methods known in the art, to provide greater flexibility and utilization of the computational power of the data processing system 260.

In the preferred embodiment, the processing system 260 therefore assembles a contact list of those contact trigger values or conditions which have been satisfied. This contact list may include necessary information regarding the particular user-specified condition which has been satisfied, the identity of the associated user, and any other relevant data which is to be transmitted to the user. After all of the relevant customer specified functions have been computed 124 and tested 125, a complete contact list assembled, the main CPU of the data processing system 260 may then continue to monitor 120 the input data 121. The necessary control functions associated with the contact sequences may be performed concurrently during periods between input data processing, according to time sharing and interrupt sequences known in the art.

For each contact sequence which has been scheduled as described, the system 260 loads 130 from memory 263 the name of the respective user, the hierarchical contact address list, and any contact conditions specified. In the preferred embodiment, customer contact is accomplished by use of telephone contact either with the user directly, or with a data terminal or a home computer of the user supplied with an automatic answering modem. Although alternative forms of contact utilizing, for example, other forms of telecommunication networks are similarly possible, the following description will pertain specifically to the use of telephone contact. Therefore, the hierarchical listing of contact address will, in the preferred embodiment, comprise telephone numbers at which the user, or the user's personal data system, may be reached.

The contact conditions may further specify that the call is to be made to the user directly, to the user's computer, or both. For example, the user may request to be notified directly by means of telephone contact to receive the information in near real-time and also request a permanent record via the user's computer to serve as a backup in the event that the user is not directly available at any of the specified phone numbers.

Once the contact data has been loaded 130, the data processing system 260 then composes an appropriate notification message describing which security has met its trigger value, which condition was being tested, and other relevant details of the trade which caused the trigger value to be met.

If the contact data indicates that the call is to be made to a computer or data terminal, this message is composed in a computer readable format, whereas voice synthesis techniques are utilized to compose an intelligible audio signal if the contact is to be made directly to the user.

After composing 130 of the appropriate message, and after any Exchange imposed delays 131, the contact is initiated 132. If the contact is to a computer system, this may be accomplished by means of an automatic dialing modem 275 utilizing the telephone network 276. If voice contact the user is desired, an automatic dialer 281 may be utilized in conjunction with a communication line processor 280 to initiate contact via an appropriate interface 284 (if required) and telephone line 285.

If a busy signal or other signal indicating that contact has not been established is received 133, the system in one configuration may schedule a subsequent call after waiting 134 some selected period of time. This sequence may be continued indefinitely, may be terminated after a preselected number of attempts, or may proceed in any manner specified by the user.

If no busy signal 133 is received, the system tests to determine whether an answer 135 is received. If the contact is to the home computer of the user, the test for answer 135 may be accomplished by having the data modem 275 or communication line processor 270 detect a return signal generated by the answering modem of the home computer system utilized, in a manner known in the art. If, however, voice notification is to be delivered directly to the user, no automatic return signal will be presented. Therefore, the preferred embodiment incorporates a line status monitor 282 connected to the telephone line 285 via line interface 284. This status monitor 282 may detect busy signals, ringing signals, offhook conditions, or voice band energy, and may therefore detect whether the dialed telephone has been answered.

If an answer 135 is received, the composed message is delivered 140. If voice contact to the user has been specified, the communication line processor 280 operates in conjunction with voice synthesis apparatus 283 to create an intelligible audio output which is then delivered via line interface 284 to the telephone line 285. Alternatively, the dialing, status monitoring, and voice synthesizing functions may be performed by the main CPU of the data processing system 260 itself. However, by utilizing an independent communication line processor 280 as in the preferred embodiment shown, the computational overhead on the main CPU is reduced.

Verification of the receipt of the successful message may be specified and required by the user. Such verification with respect to a message transmitted to the home computer of the user may comprise a return signal or handshaking scheme indicating that valid data of correct parity has been received, in a manner known in the art. With respect to voice contact with the user directly, a preselected verification code may be entered by the user via the telephone key pad or telephone dial, to indicate that the appropriate person has in fact been contacted and has understood the transmitted information. Alternatively, the system may deliver an initial message indicating that there is a further message for the specific user, thereafter delivering the actual information only upon receipt of a preselected verification code from the user. By requiring optional verification, it is seen that a more secure and intelligent contact scheme results. For example, premature termination of the contact sequence further described below will not result if a wrong number is reached, or if a specified number is reached but the answering party is not the intended user. Further, security is provided so that unintended or undesired parties to not receive the possibly confidential or sensitive information intended for the user.

In order to provide for such verification, a detector 286 is utilized to receive and decode the user-supplied verification data. This detector 286 may be designed to interpret the dual tone multi-frequency output of the standard push button telephone dial pad, the pulse code output of the standard telephone rotary dial, or a specialized audio frequency signal delivered by the user to the mouth piece of the telephone, in manners known in the art.

If the appropriate verification 141 is received, or if the call is answered 135 and no verification is requested, a successful notification has occurred. In this event, the data processing system 260 may post an appropriate accounting record 142 indicating that a service has been performed for the respective user's benefit, and the system may then undertake the next contact sequence required 130, or simply await the next data input 121.

If no answer 135 is detected by either the data modem 275 or the line status monitor 282, a successful contact has not been achieved. In this event, the system may optionally wait 134 and attempt another contact at the same telephone number, or may select the next telephone number 136 from the hierarchical listing supplied by the user. Similarly, if appropriate verification 141 is required but not received, the preferred embodiment selects the next number 136 from the hierarchical listing, and repeats the contact sequence 132 previously described.

If all numbers in the hierarchical listing have been unsuccessfully tried such that the end of the list 137 is reached, the user may either have the notification sequence terminated, with an appropriate accounting record 142 reflecting the attempted contact optionally posted, or may select to have the sequence repeated 138. If the sequence is to be repeated, a preferred embodiment stores 143 the information which is to be transmitted, and optionally delays 144 a selected time before reloading 145 the associated contact data and again initiating 132 the contact sequence.

The foregoing description and drawings merely explain and illustrate the invention; the invention is not limited thereto, except insofar as the appended claims are so limited, for those skilled in the art who have the disclosure before them will be able to make modifications and variations therein without departing from the spirit and scope of the present invention.

I claim:

1. A data monitoring and notification system comprising:
    means for receiving input data pertaining to classes of events of interests;
    means for deriving subclasses of selected relevant data from said received input data, said means operatively connected to said receiving means whereby said deriving means may process said received data;
    means for receiving and storing specified threshold values relating to said received and processed data;
    means for comparing said threshold values and said received and processed data to determine when said threshold values have been met; and
    means for establishing remote contact via telecommunications networks with a user and thereafter transmitting desired data pertaining to said received and processed data to said user, said contact means operatively connected to said comparing means whereby said remote contact is initiated when said threshold value is met.

2. The system of claim 1 wherein said input data comprises financial market information.

3. The system of claim 1 wherein said transmission of said desired data is accomplished by synthesized voice audio signals delivered via said telecommunications networks.

4. The system of claim 1 wherein said remote contact is accomplished by means of electronic data transfer via said telecommunictions network between said system and a remote electronic data receiving device of the user.

5. The system of claim 1 wherein said telecommunications networks comprise telephone networks.

6. The system of claim 1 wherein said telecommunications networks comprise coaxial cable distribution networks.

7. A system for monitoring financial market information in near real time and for notifying selected users upon occurrences of specific selected events of interest, said system comprising:
    a data processing system including a central processing unit and a memory system;
    first information input systems for receiving first input information comprising data pertaining to the various financial markets of interest;
    second information input systems for receiving second input information comprising data described said specific events of interest, and describing a desired notification sequence;
    information output systems for remotely contacting said users via telecommunications networks and thereafter transmitting desired information pertaining to said events of interest;
    wherein said data processing system monitors said first input information and detects the occurrence of said events of interest described by said second input data, and activates said information output system in accordance with said described desired contact sequence to initiate said remote user contact when said occurrence has been detected.

8. The system of claim 7 wherein said first information input systems receive stock ticker information pertaining to desired stock, commodities, and futures markets.

9. The system of claim 7 wherein said second information input systems comprise a data input terminal.

10. The system of claim 7 wherein said second information input systems comprise a data modem, whereby said second input data may be received by said data processing system from remote data terminals connected to said data modem by said telecommunications networks.

11. The system of claim 7 wherein said second information input system comprises a detector for receiving user-coded input data by means of said telecommunications networks.

12. The system of claim 11 wherein said detector detects coded audio signals.

13. The system of claim 12 wherein said coded audio signals comprise speech, and wherein said detector comprises means for speech recognition.

14. The system of claim 12 wherein said telecommunications networks comprise a telephone network, and wherein said coded audio signals comprise the dual tone multi-frequency output of a push button telephone key pad.

15. The system of claim 12 wherein said telecommunications networks comprise a telephone network, and wherein said coded audio signals comprise the dial pulse output of a standard rotary telephone dial.

16. The system of claim 7 wherein said information output systems comprise a speech synthesizer, said speech synthesizer producing an intelligible audio signal for transmitting said desired information.

17. The system of claim 7 wherein said information output systems comprise a data modem for transmitting said desired information to remote data terminals by means of said telecommunications network.

18. The system of claim 16 further comprising means for verifying that said data transmission should commence.

19. The system of claim 16 further comprising means for verifying that said data transmission has been received.

20. The system of claim 7 wherein said information output system further comprises means for verifying that said data transmission should commence.

21. The system of claim 7 wherein said information output system further comprises means for verifying that said data transmission has been received.

22. A method of data monitoring and notification comprising the steps of:
- receiving input data pertaining to classes of events of interest;
- storing descriptions of relevant subclasses of said input data which are of special interest;
- processing said received data and deriving said subclasses of relevant data therefrom;
- storing a set of specified conditions including specified threshold values;
- comparing said threshold values and said received and processed data to determine when said threshold values have been met; and
- initiating a contact sequence when said comparison establishes that said threshold values have been met, said contact sequence for remotely contacting a user via telecommunications networks and thereafter transmitting desired data to said user pertaining to said received and processed data.

23. The method of claim 22 further comprising the steps of further processing said subclasses of relevant data in accordance with processing instructions contained within said set of specified conditions, and comparing said threshold values also to said further processed relevant data to determine when said further processed data meets said threshold values.

24. The method of claim 23 wherein said processing of said data further includes the steps of maintaining historical data files pertaining to select subclasses of relevant data, and appropriately updating said historical data files upon receipt of said select subclass of relevant data.

25. The method of claim 23 wherein said specified conditions further include adaptive conditions, and wherein said method further comprises the step of modifying said adaptive conditions in response to receipt of associated subclasses of relevant data.

26. The method of claim 22 wherein said telecommunications networks comprise a telephone network.

27. The method of claim 22 wherein said relevant data is transmitted after receiving a verification that appropriate contact has been established.

28. The method of claim 22 wherein said specified conditions further include a hierarchical listing of telecommunications network addresses, and wherein said method further includes the steps of initiating additional attempted contacts at other hierarchical listed addresses when a previously attempted contact has failed.

29. The method of claim 22 wherein said relevant data is transmitted to said user via said telecommunications network as a user-intelligible synthesized voice audio signal.

30. The method of claim 22 wherein said relevant data is transmitted via said telecommunications network to a data receiving terminal of said user.

31. The method of claim 22 wherein said contact sequence is terminated after receiving a verification that said data transmission has been received.

32. The method of claim 22 wherein the step of storing descriptions of relevant subclasses of said input data further comprises the steps of:
- receiving description input data signals via said telecommunications networks;
- processing said description input data signals to derive said descriptions therefrom; and
- storing said descriptions.

33. The method of claim 32 wherein said description input data signals comprise the dual tone multi-frequency output of a push button telephone key pad.

34. The system of claim 32 wherein said description input data signals comprise speech, and wherein said step of processing said description input data signals comprises speech recognition.

35. The method of claim 22 wherein said step of storing a set of specified conditions further comprises the steps of:
- receiving specified condition data signals via said telecommunications networks;
- processing said specified condition data signals to derive said specified conditions therefrom; and
- storing said specified conditions.

36. The method of claim 35 wherein said specified condition data signals comprise the dual tone multi-frequency output of a push button telephone key pad.

37. The method of claim 35 wherein said specified condition data signals comprise speech, and wherein said step of processing said specified condition data signals comprises speech recognition.

38. A method for monitoring financial market information in near real time and for notifying selected users upon occurrences of specific events of interest, said method comprising the steps of:
- receiving input data pertaining to the financial markets of interest;
- storing descriptions of specific securities and information which is of special interest to specified users;
- comparing said received input data to said descriptions to identify that portion of said input data which is of special interest;
- storing a set of user-specified conditions including specified threshold valves;
- comparing said identified input data of special interest to said threshold values to determine when one or more of said threshold values have been met;
- initiating a remote contact with the users whose specified threshold values have been met, said contact initiated via telecommunications networks when one or more of said threshold values have been met; and
- thereafter transmitting relevant information pertaining to said financial markets to said users.

39. The method of claim 38 wherein said set of user-specified conditions further includes processing instructions, and wherein said method further comprises the steps of processing said identified input data according to said processing instructions, and comparing the processed results to said threshold values to determine when one or more threshold values have been met by said processed results.

40. The method of claim 38 wherein said set of user-specified conditions further includes a desired contact sequence description, and wherein said remote contact proceeds in accordance with said contact sequence description.

41. The method of claim 40 wherein said contact sequence description includes a hierachical listing of alternate telecommunications network addresses, and wherein said remote contact comprises the steps of initiating a first attempted user contact at a first of said hierarchical addresses, and thereafter initiating additional attempted contacts at subsequent hierarchical addresses when a previously attempted contact has failed.

42. The method of claim 40 wherein said contact sequence description further includes a pre-transmission verification requirement, and wherein said method further comprises the steps of:

transmitting a preliminary message when said remote contact has been achieved;

testing for receipt of a pre-transmission verification signal; and transmitting said relevant financial market information only if said pre-transmission verification signal is received.

43. The method of claim 40 wherein said contact sequence description further includes a post-transmission verification requirement, and wherein said method further comprises the steps of:

testing for receipt of a post-transmission verification signal; and continuing said remote contact in accordance with said contact sequence description if said post-transmission verification signal is not received.

44. The method of claim 38 wherein said user-specified conditions further include adaptive conditions, and wherein said method further comprises the step of modifying said said adaptive conditions in response to said received input data.

45. The system of claim 38 wherein said remote contact further comprises the steps of generating a voice synthesized audio signal representative of said relevant information, and thereafter transmitting said audio signal to said users.

* * * * *